United States Patent
Kazi et al.

(10) Patent No.: US 10,860,256 B2
(45) Date of Patent: *Dec. 8, 2020

(54) STORING DATA UTILIZING A MAXIMUM ACCESSIBILITY APPROACH IN A DISPERSED STORAGE NETWORK

(71) Applicant: International Business Machines Corporation, Armonk, NY (US)

(72) Inventors: Asimuddin Kazi, Naperville, IL (US); Jason K. Resch, Chicago, IL (US)

(73) Assignee: PURE STORAGE, INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/298,150

(22) Filed: Mar. 11, 2019

(65) Prior Publication Data
US 2019/0205033 A1    Jul. 4, 2019

Related U.S. Application Data

(63) Continuation of application No. 15/840,151, filed on Dec. 13, 2017, now Pat. No. 10,331,384, which is a (Continued)

(51) Int. Cl.
*G06F 3/06* (2006.01)
*G06F 16/27* (2019.01)
(Continued)

(52) U.S. Cl.
CPC .............. *G06F 3/067* (2013.01); *G06F 3/061* (2013.01); *G06F 3/0604* (2013.01); *G06F 3/064* (2013.01);
(Continued)

(58) Field of Classification Search
CPC ...... G06F 3/0619; G06F 3/067; G06F 3/0604; G06F 3/065; G06F 11/1076;
(Continued)

(56) References Cited

U.S. PATENT DOCUMENTS

| | | |
|---|---|---|
| 4,092,732 A | 5/1978 | Ouchi |
| 5,454,101 A | 9/1995 | Mackay et al. |

(Continued)

OTHER PUBLICATIONS

Chung; An Automatic Data Segmentation Method for 3D Measured Data Points; National Taiwan University; pp. 1-8; 1998.
(Continued)

*Primary Examiner* — Shelly A Chase
(74) *Attorney, Agent, or Firm* — Garlick & Markison; Timothy W. Markison; Bruce E. Stuckman

(57) ABSTRACT

A method for execution by a dispersed storage and task (DST) processing unit of a dispersed storage network includes determining to store data in a storage pool utilizing a maximum accessibility approach. A storage unit performance factor is determined for a plurality of storage units of the storage pool. A number of instances of data storage per storage unit is established based on the storage unit performance factor. A replication factor across the plurality of storage units of the storage pool is also established. A total number C of storage instances for the data is determined based on the number of instances of data storage per storage unit and the replication factor. C number of source names for C storage instances of the data are generated. Storage of the C storage instances of the data is facilitated.

20 Claims, 6 Drawing Sheets

Related U.S. Application Data continuation-in-part of application No. 15/837,705, filed on Dec. 11, 2017, now Pat. No. 10,387,070, which is a continuation-in-part of application No. 15/006,735, filed on Jan. 26, 2016, now Pat. No. 10,079,887.

(60) Provisional application No. 62/140,861, filed on Mar. 31, 2015.

(51) Int. Cl.
*G06F 9/50* (2006.01)
*G06F 11/10* (2006.01)
*G06F 21/62* (2013.01)
*H04L 29/08* (2006.01)
*H04L 29/06* (2006.01)

(52) U.S. Cl.
CPC ............ *G06F 3/065* (2013.01); *G06F 3/0619* (2013.01); *G06F 3/0631* (2013.01); *G06F 3/0638* (2013.01); *G06F 9/5016* (2013.01); *G06F 11/1076* (2013.01); *G06F 16/27* (2019.01); *G06F 21/6218* (2013.01); *H04L 67/1097* (2013.01); *H04L 63/101* (2013.01); *H04L 67/306* (2013.01)

(58) Field of Classification Search
CPC ............ G06F 11/0727; G06F 11/1448; G06F 3/0638; G06F 16/27; H04L 67/306; H04L 67/1097
See application file for complete search history.

(56) References Cited

U.S. PATENT DOCUMENTS

| | | | |
|---|---|---|---|
| 5,485,474 A | 1/1996 | Rabin |
| 5,774,643 A | 6/1998 | Lubbers et al. |
| 5,802,364 A | 9/1998 | Senator et al. |
| 5,809,285 A | 9/1998 | Hilland |
| 5,890,156 A | 3/1999 | Rekieta et al. |
| 5,987,622 A | 11/1999 | Lo Verso et al. |
| 5,991,414 A | 11/1999 | Garay et al. |
| 6,012,159 A | 1/2000 | Fischer et al. |
| 6,058,454 A | 5/2000 | Gerlach et al. |
| 6,128,277 A | 10/2000 | Bruck et al. |
| 6,175,571 B1 | 1/2001 | Haddock et al. |
| 6,192,472 B1 | 2/2001 | Garay et al. |
| 6,256,688 B1 | 7/2001 | Suetaka et al. |
| 6,272,658 B1 | 8/2001 | Steele et al. |
| 6,301,604 B1 | 10/2001 | Nojima |
| 6,356,949 B1 | 3/2002 | Katsandres et al. |
| 6,366,995 B1 | 4/2002 | Vilkov et al. |
| 6,374,336 B1 | 4/2002 | Peters et al. |
| 6,415,373 B1 | 7/2002 | Peters et al. |
| 6,418,539 B1 | 7/2002 | Walker |
| 6,449,688 B1 | 9/2002 | Peters et al. |
| 6,567,948 B2 | 5/2003 | Steele et al. |
| 6,571,282 B1 | 5/2003 | Bowman-Amuah |
| 6,609,223 B1 | 8/2003 | Wolfgang |
| 6,718,361 B1 | 4/2004 | Basani et al. |
| 6,760,808 B2 | 7/2004 | Peters et al. |
| 6,785,768 B2 | 8/2004 | Peters et al. |
| 6,785,783 B2 | 8/2004 | Buckland |
| 6,826,711 B2 | 11/2004 | Moulton et al. |
| 6,879,596 B1 | 4/2005 | Dooply |
| 7,003,688 B1 | 2/2006 | Pittelkow et al. |
| 7,024,451 B2 | 4/2006 | Jorgenson |
| 7,024,609 B2 | 4/2006 | Wolfgang et al. |
| 7,080,101 B1 | 7/2006 | Watson et al. |
| 7,103,824 B2 | 9/2006 | Halford |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,222,133 B1 | 5/2007 | Raipurkar et al. |
| 7,240,236 B2 | 7/2007 | Cutts et al. |
| 7,272,613 B2 | 9/2007 | Sim et al. |
| 7,636,724 B2 | 12/2009 | de la Torre et al. |
| 8,566,354 B2 | 10/2013 | Grube et al. |
| 9,122,596 B2 * | 9/2015 | Grube .................. G06F 16/972 |
| 9,529,548 B1 | 12/2016 | OMaolcatha et al. |
| 2002/0062422 A1 | 5/2002 | Butterworth et al. |
| 2002/0166079 A1 | 11/2002 | Ulrich et al. |
| 2003/0018927 A1 | 1/2003 | Gadir et al. |
| 2003/0037261 A1 | 2/2003 | Meffert et al. |
| 2003/0065617 A1 | 4/2003 | Watkins et al. |
| 2003/0084020 A1 | 5/2003 | Shu |
| 2004/0024963 A1 | 2/2004 | Talagala et al. |
| 2004/0122917 A1 | 6/2004 | Menon et al. |
| 2004/0215998 A1 | 10/2004 | Buxton et al. |
| 2004/0228493 A1 | 11/2004 | Ma |
| 2005/0100022 A1 | 5/2005 | Ramprashad |
| 2005/0114594 A1 | 5/2005 | Corbett et al. |
| 2005/0125593 A1 | 6/2005 | Karpoff et al. |
| 2005/0131993 A1 | 6/2005 | Fatula |
| 2005/0132070 A1 | 6/2005 | Redlich et al. |
| 2005/0144382 A1 | 6/2005 | Schmisseur |
| 2005/0229069 A1 | 10/2005 | Hassner et al. |
| 2006/0047907 A1 | 3/2006 | Shiga et al. |
| 2006/0136448 A1 | 6/2006 | Cialini et al. |
| 2006/0156059 A1 | 7/2006 | Kitamura |
| 2006/0224603 A1 | 10/2006 | Correll |
| 2007/0079081 A1 | 4/2007 | Gladwin et al. |
| 2007/0079082 A1 | 4/2007 | Gladwin et al. |
| 2007/0079083 A1 | 4/2007 | Gladwin et al. |
| 2007/0088970 A1 | 4/2007 | Buxton et al. |
| 2007/0174192 A1 | 7/2007 | Gladwin et al. |
| 2007/0214285 A1 | 9/2007 | Au et al. |
| 2007/0234110 A1 | 10/2007 | Soran et al. |
| 2007/0283167 A1 | 12/2007 | Venters et al. |
| 2009/0094251 A1 | 4/2009 | Gladwin et al. |
| 2009/0094318 A1 | 4/2009 | Gladwin et al. |
| 2010/0023524 A1 | 1/2010 | Gladwin et al. |
| 2014/0337686 A1 | 11/2014 | Baptist et al. |
| 2017/0075965 A1 | 3/2017 | Liu et al. |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): String Representation of Search Filters; IETF Network Working Group; RFC 4515; Jun. 2006; pp. 1-12.

Smith; Lightweight Directory Access Protocol (LDAP): Uniform Resource Locator; IETF Network Working Group; RFC 4516; Jun. 2006; pp. 1-15.

(56) References Cited

OTHER PUBLICATIONS

Wildi; Java iSCSi Initiator; Master Thesis; Department of Computer and Information Science, University of Konstanz; Feb. 2007; 60 pgs.

Xin, et al.; Evaluation of Distributed Recovery in Large-Scale Storage Systems; 13th IEEE International Symposium on High Performance Distributed Computing; Jun. 2004; pp. 172-181.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): Directory Information Models; IETF Network Working Group; RFC 4512; Jun. 2006; pp. 1-49.

Zeilenga; Lightweight Directory Access Protocol (LDAP): Internationalized String Preparation; IETF Network Working Group; RFC 4518; Jun. 2006; pp. 1-14.

Zeilenga; Lightweight Directory Access Protocol (LDAP): String Representation of Distinguished Names; IETF Network Working Group; RFC 4514; Jun. 2006; pp. 1-15.

* cited by examiner

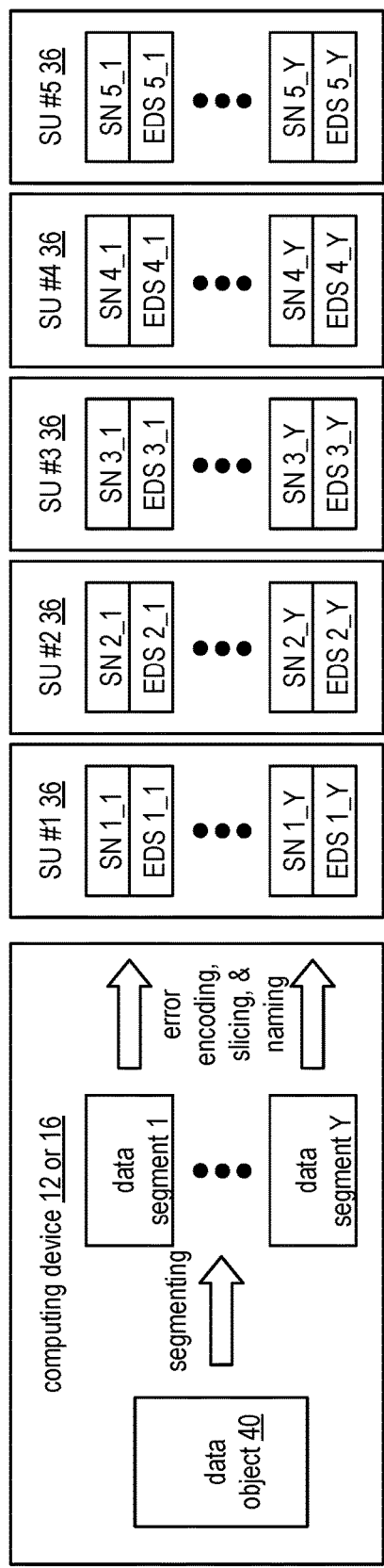
FIG. 3
FIG. 4
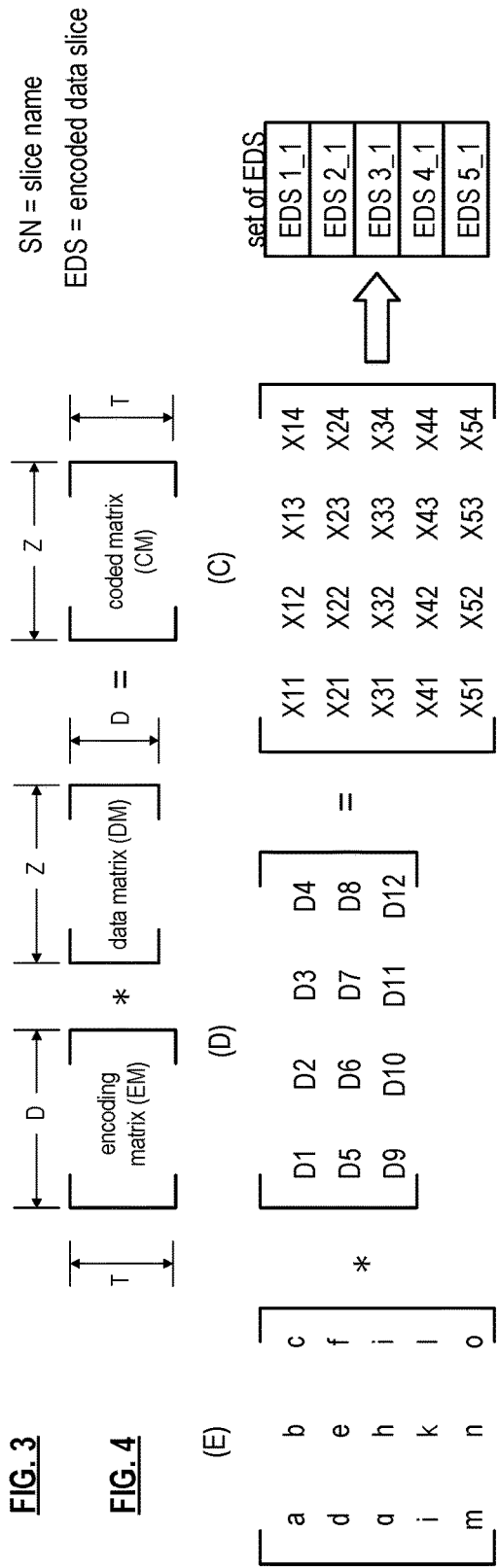
FIG. 5
FIG. 6

STORING DATA UTILIZING A MAXIMUM ACCESSIBILITY APPROACH IN A DISPERSED STORAGE NETWORK

CROSS-REFERENCE TO RELATED APPLICATIONS

The present U.S. Utility Patent Application claims priority pursuant to 35 U.S.C. § 120 as a continuation of U.S. Utility application Ser. No. 15/840,151, entitled "STORING DATA UTILIZING A MAXIMUM ACCESSIBILITY APPROACH IN A DISPERSED STORAGE NETWORK", filed Dec. 13, 2017, which is a continuation-in-part of U.S. Utility application Ser. No. 15/837,705, entitled "ADDING INCREMENTAL STORAGE RESOURCES IN A DISPERSED STORAGE NETWORK", filed Dec. 11, 2017, which is a continuation-in-part of U.S. Utility application Ser. No. 15/006,735, entitled "MODIFYING STORAGE CAPACITY OF A SET OF STORAGE UNITS", filed Jan. 26, 2016, issued as U.S. Pat. No. 10,079,887 on Sep. 18, 2018, which claims priority pursuant to 35 U.S.C. § 119(e) to U.S. Provisional Application No. 62/140,861, entitled "MODIFYING STORAGE CAPACITY OF A STORAGE UNIT POOL", filed Mar. 31, 2015, all of which are hereby incorporated herein by reference in their entirety and made part of the present U.S. Utility Patent Application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

DETAILED DESCRIPTION OF THE INVENTION

Figure 1:
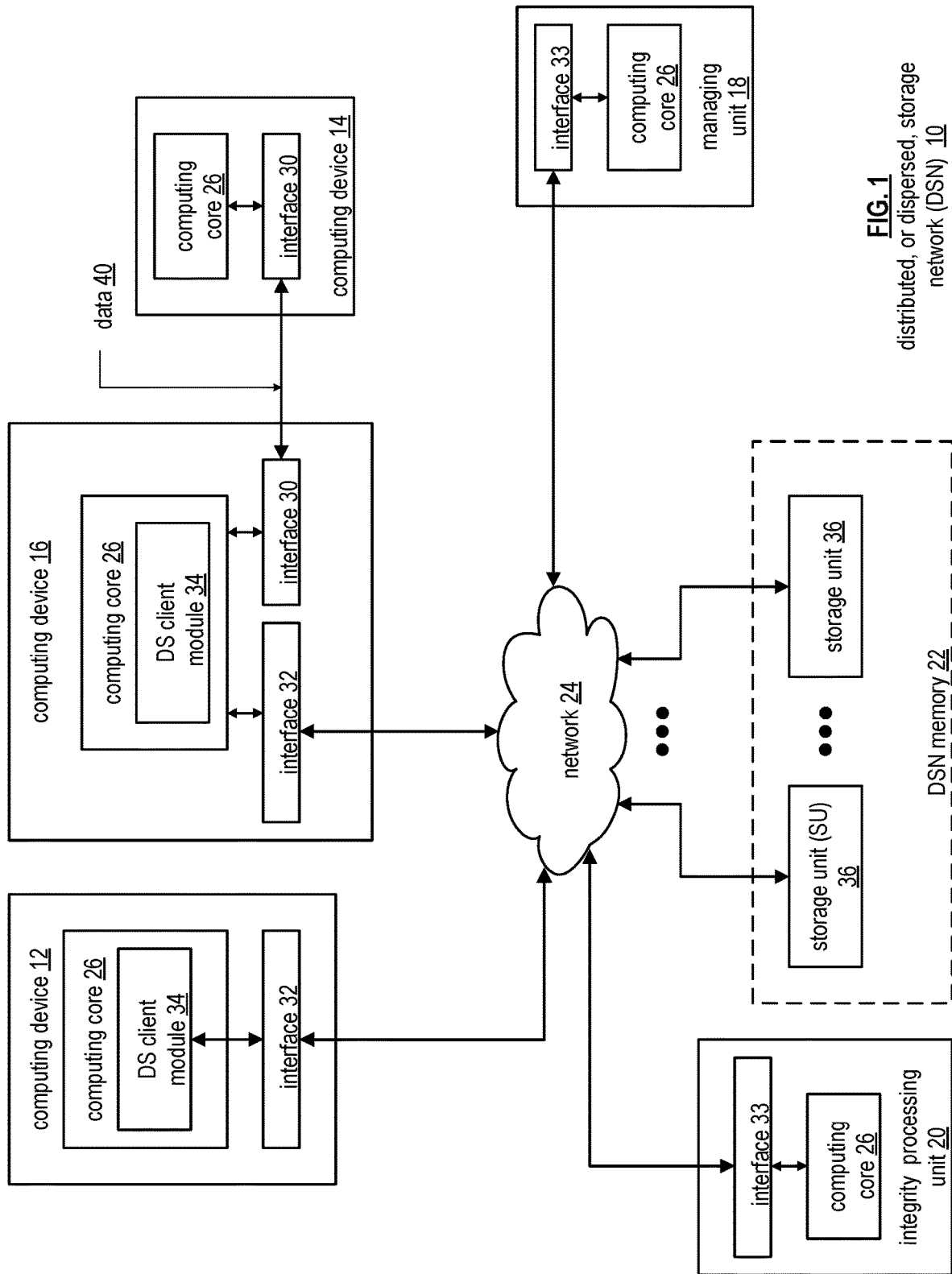
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
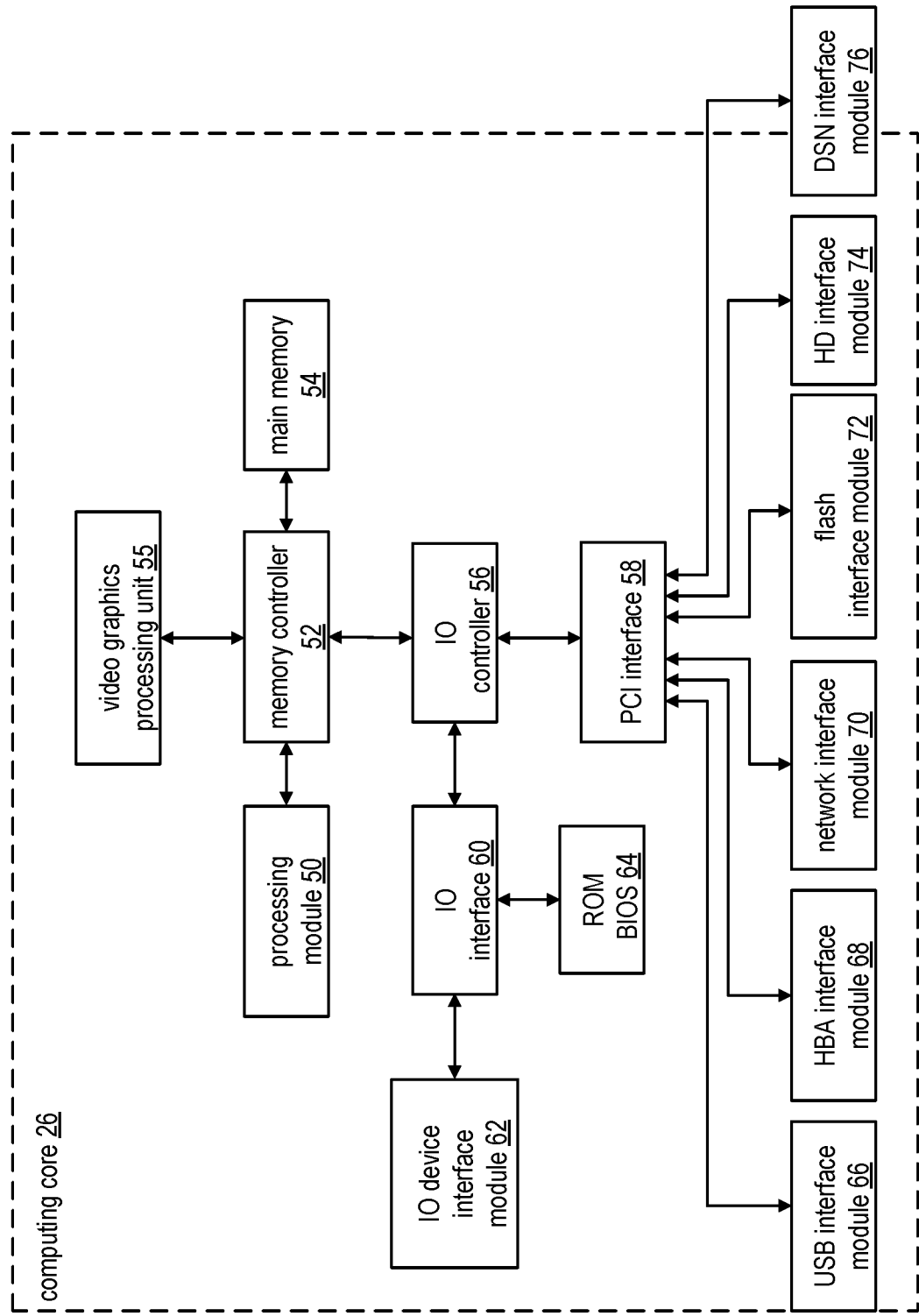
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

In various embodiments, each of the storage units operates as a distributed storage and task (DST) execution unit, and is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. Hereafter, a storage unit may be interchangeably referred to as a dispersed storage and task (DST) execution unit and a set of storage units may be interchangeably referred to as a set of DST execution units.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each managing unit 18 and the integrity processing unit 20 may be separate computing devices, may be a common computing device, and/or may be integrated into one or more of the computing devices 12-16 and/or into one or more of the storage units 36. In various embodiments, computing devices 12-16 can include user devices and/or can be utilized by a requesting entity generating access requests, which can include requests to read or write data to storage units in the DSN.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an 10 interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. Here, the computing device stores data object 40, which can include a file (e.g., text, video, audio, etc.), or other data arrangement. The dispersed storage error encoding parameters include an encoding function (e.g., information dispersal algorithm (IDA), Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides data object 40 into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figures 7, 8:
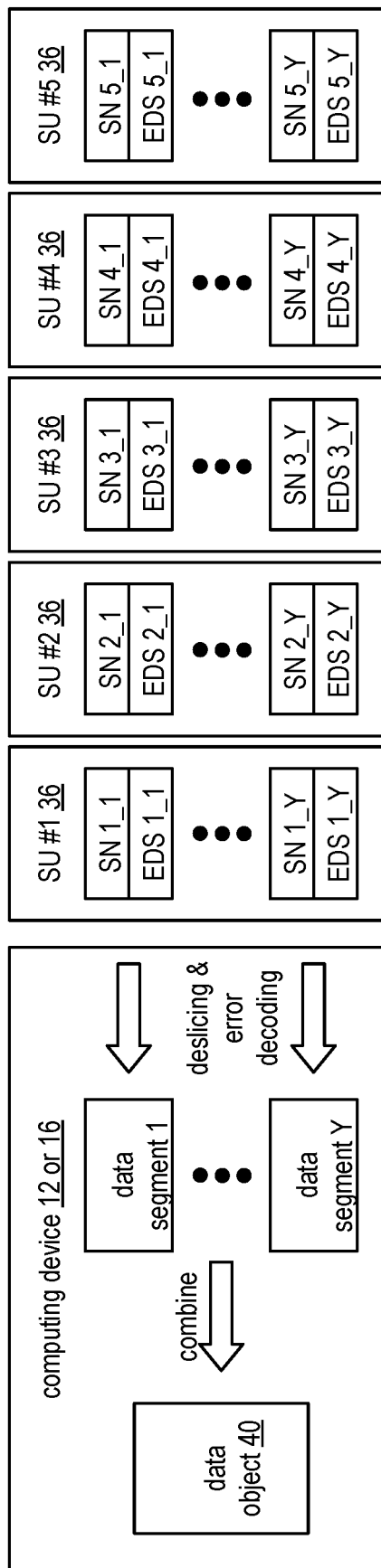
FIG. 7 is a schematic block diagram of an example of dispersed storage error decoding of data in accordance with the present invention.
FIG. 8 is a schematic block diagram of a generic example of an error decoding function in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
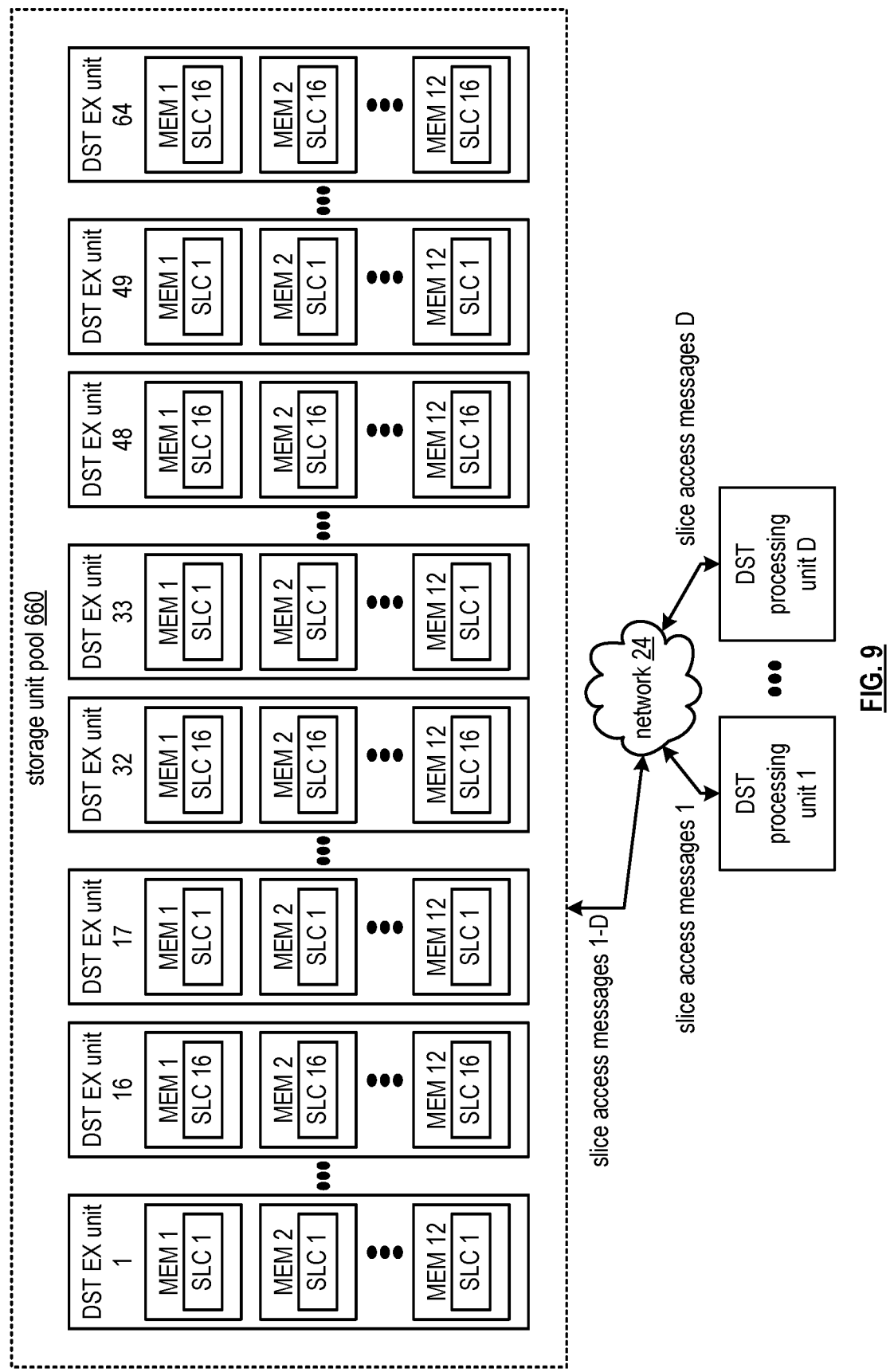
FIG. 9 is a schematic block diagram of an embodiment of a dispersed or distributed storage network (DSN) in accordance with the present invention.

FIG. 9 is a schematic block diagram of another embodiment of a dispersed storage network (DSN) that includes a storage unit pool 660, the network 24 of FIG. 1, and a plurality of distributed storage and task (DST) processing units 1-D. The storage unit pool 660 includes a plurality of DST execution units. Each DST execution unit includes a plurality of memories. Each memory can be implemented utilizing the memory 54 of FIG. 2 or another memory device. Each DST execution unit may be implemented utilizing the storage unit 36 of FIG. 1. Each DST processing unit may be implemented utilizing the computing device 16 of FIG. 1. The DSN functions to utilize a maximum accessibility approach for accessing stored data within the storage pool, where the maximum accessibility approach includes substantially simultaneous accessing of common data within the storage pool by the plurality of DST processing units resulting in favorable access performance levels.

In certain situations, some forms of content may need to be distributed to as many entities as possible as rapidly as possible. To maximize the ability of a DSN memory to distribute information, slices created from a source can be distributed across a maximum number of independent storage units, and it may be desirable to accomplish this as quickly as possible. For example, in a DSN memory with a width of 16, composed of 64 storage units, the same source may be encoded on up to (64/16)=4 independent "stripes" of storage units, thus making it possible for requesters to retrieve slices in parallel from up to four times as many locations as if the source were stored to only a single stripe. This concept can also be extended further if the memory devices internal to each storage unit have a throughput capacity less than that of the storage unit. For example, if each of the 64 storage units contain 12 memory devices, then up to (12*64/16)=48 instances of the source's slices can be stored, thereby enabling up to 48 times the throughput for access of this source compared to if it is stored on only a width number of memory devices within a width number of storage units.

The process for distributing an object for maximum accessibility and throughput begins by first characterizing the ratio between the memory device throughput rate and the storage unit throughput rate. For example, if the memory device operates at up to 100 MB/s and the storage unit operates at up to 1000 GB/s, then there is no performance advantage in storing more than 10 instances within a single storage unit, and the minimum of this ratio or the number of disks in each storage unit will be used (e.g. Min(10, 12)=10). The next step is to determine the ratio between the number of storage units and the IDA width. In the example above, the 64:16 ratio is 4. Finally, the storage processing unit multiplies both ratios together to yield the number of instances to be stored, in this case: C=10*4=40. To enable the source to be stored on unique sets of storage units, a computing device can select a source name at random, and then adds 1/C of the namespace range C times to produce 40 unique source names (each 1/C of the namespace apart). By maximizing the distance between the names, it can guarantee that the slices fall as far apart as possible, and thus can ensure the slices will be on different memory devices as well, with each storage unit receiving slices from 10 different instances of the source.

Upon retrieval of the source (the metadata for the object may indicate the object's C value and starting name) the computing device can determine the alternate related names under which the object can be accessed and can choose one at random and/or pseudo-randomly. Thus, when under high load from many requesters, the load will be evenly spread across all storage units and across multiple memory devices within those storage units. This approach may be used for data that is under high demand, and/or when minimizing distribution time is paramount, e.g. when distributing upgrade packages. To reduce the amount of time it takes a single writer to write C instances of the object, the computing device can write the slice to only a single set of locations and then instruct the receiving storage units to pass along the slice under the permuted name to following sets of storage units, thus avoiding any bottleneck in the distribution of the many instances of that source's slices. Note that the number of instances created can in some cases be chosen to be less than C (e.g. an L<C), which is the point at which maximum throughput can be achieved, but the same approach of deriving various off-set source names can still be used (only with some lower number L).

In an example of operation of the utilization of the maximum accessibility approach, the DST processing unit 1 determines to store data in the storage pool utilizing the maximum accessibility approach. The determining can include at least one of interpreting a request and/or identifying the data as frequently accessed by multiple requesting entities (e.g., many other DST processing units).

Having determined to store the data utilizing the maximum accessibility approach, the DST processing unit 1 can determine a storage unit performance factor for the DST execution units of the storage pool. The determining includes dividing a storage unit throughput rate by a memory device throughput rate. For example, the DST processing unit 1 divides a storage unit throughput rate of 1 GB per second by a memory device throughput rate of 100 MB per second equaling 10 as the storage unit performance factor.

Having determined the storage unit performance factor, the DST processing unit 1 can establish a number of instances of storage per storage unit as a minimum number of the performance factor and a number of memories of the storage unit. For example, the DST processing unit 1 establishes the number of instances as 10 when the performance factor is 10 and the number of memories is 12.

Having established the number of instances of storage per storage unit, the DST processing unit 1 can calculate a ratio between the number of storage units and an information dispersal algorithm (IDA) width. For example, the DST processing unit 1 calculates the ratio as 64 divided by 16=4, when the IDA width is 16 and the number of DST execution units is 64 (e.g., the storage pool includes DST execution units 1-64).

Having calculated the ratio, the DST processing unit 1 can determine a number of storage instances (e.g., total number) for the data based on the number of instances per storage unit and the ratio between the number of storage units and the IDA width. For example, the DST processing unit 1 determines the number of storage instances=C=number of instances per storage unit X the ratio between the number of storage units and the IDA width=4×10=40=C.

Having determined the number of storage instances C, the DST processing unit 1 can generate C number of source names for the C instances. The generating can include generating a first source name (e.g., to include a vault identifier associated with the data, a generation number, and a random object number), and/or generating the remaining source names spaced apart by 1/C across a DSN address range associated with the storage pool. The generating can further associate a name of the data object with one or more of the first source name and/or the value C to facilitate subsequent retrieval (e.g., a DSN directory and/or a dispersed hierarchical index is updated to associate the name of the data object with the first source name and the value C).

Having generated the source names, the DST processing unit 1 can facilitate generation and storage of the C instances of the data. For example, the DST processing unit 1 dispersed storage error encodes the data to produce a plurality of sets of encoded data slices, and for each instance, sends, via the network 24, slice access messages 1 that includes the plurality sets of encoded data slices to a set of storage units associated with a set of memory devices corresponding to C of the instances for storage. For instance, the DST processing unit 1 sends a first encoded data slice of a set of 16 encoded slices to DST execution units 1, 17, 33, and 49 where each of the DST execution units 1, 17, 33, and 49 stores the first encoded data slice in 10 of the 12 memories in accordance with the C source names to effectively replicate the first encoded data slice across 10 of the 12 memories.

When accessing the data, a DST processing unit can access a directory to identify the first source name and the value of C, can randomly and/or pseudo-randomly select one instance, can calculate a source name corresponding to the selected one instance, and can recover the data from the one instance. As such, a system performance improvement can be provided where the plurality of DST processing units substantially simultaneously access the C instances of the stored data.

In various embodiments, a processing system of a dispersed storage and task (DST) processing unit includes at least one processor and a memory that stores operational instructions, that when executed by the at least one processor cause the processing system to determine to store data in a storage pool utilizing a maximum accessibility approach. A storage unit performance factor is determined for a plurality of storage units of the storage pool. A number of instances of data storage per storage unit is established based on the storage unit performance factor. A replication factor across the plurality of storage units of the storage pool is also established. A total number C of storage instances for the data is determined based on the number of instances of data storage per storage unit and the replication factor. C number of source names for C storage instances of the data are generated. Storage of the C storage instances of the data is facilitated.

In various embodiments, determining to store the data in a storage pool utilizing a maximum accessibility approach includes determining the data exceeds an access frequency threshold and further includes determining that available storage capacity is greater than a minimum storage capacity threshold level. In various embodiments, determining the storage unit performance factor includes dividing a storage unit throughput level by a memory device throughput level. In various embodiments, the number of instances of data storage per storage unit is established as a minimum of a number of memory devices per storage unit and the storage unit performance factor. In various embodiments, establishing the replication factor includes calculating the replication factor by dividing a number of storage units of the storage pool by an information dispersal algorithm (IDA) width. In various embodiments, determining the total number C of storage instances includes calculating the total number C of storage instances by multiplying the number of instances of data storage by the replication factor.

In various embodiments, generating C number of source names for the C storage instances of the data includes generating a first source name for the data. A DSN address range for the storage pool is identified. Further source name space is generated by spacing source names apart by the DSN address range divided by C across the DSN address range starting with the first source name. A directory to associate the first source name and the value of C. In various embodiments, it is determined to recover the data. The directory is accessed to recover the first source name and the value of C. One of the C storage instances is pseudo-randomly selected for recovery. A source name corresponding to the selected one of the C storage instances is calculated based on the first source name and the value of C. The data is recovered from the selected one of the C storage instances.

In various embodiments, facilitating storage of the C storage instances of the data includes, for each storage instance of the C storage instances, generating a plurality of sets of slice names based on a corresponding sourcing. The data is dispersed storage error encoded to produce a plurality of sets of encoded data slices corresponding to the plurality of sets of slice names. A plurality of write slice requests that includes the plurality of sets of slice names and the corresponding plurality of sets of encoded data slices. The plurality of write slice requests is sent to a set of storage units of the plurality of storage units, where the set of storage units is associated with the storage instance.

Figure 10:
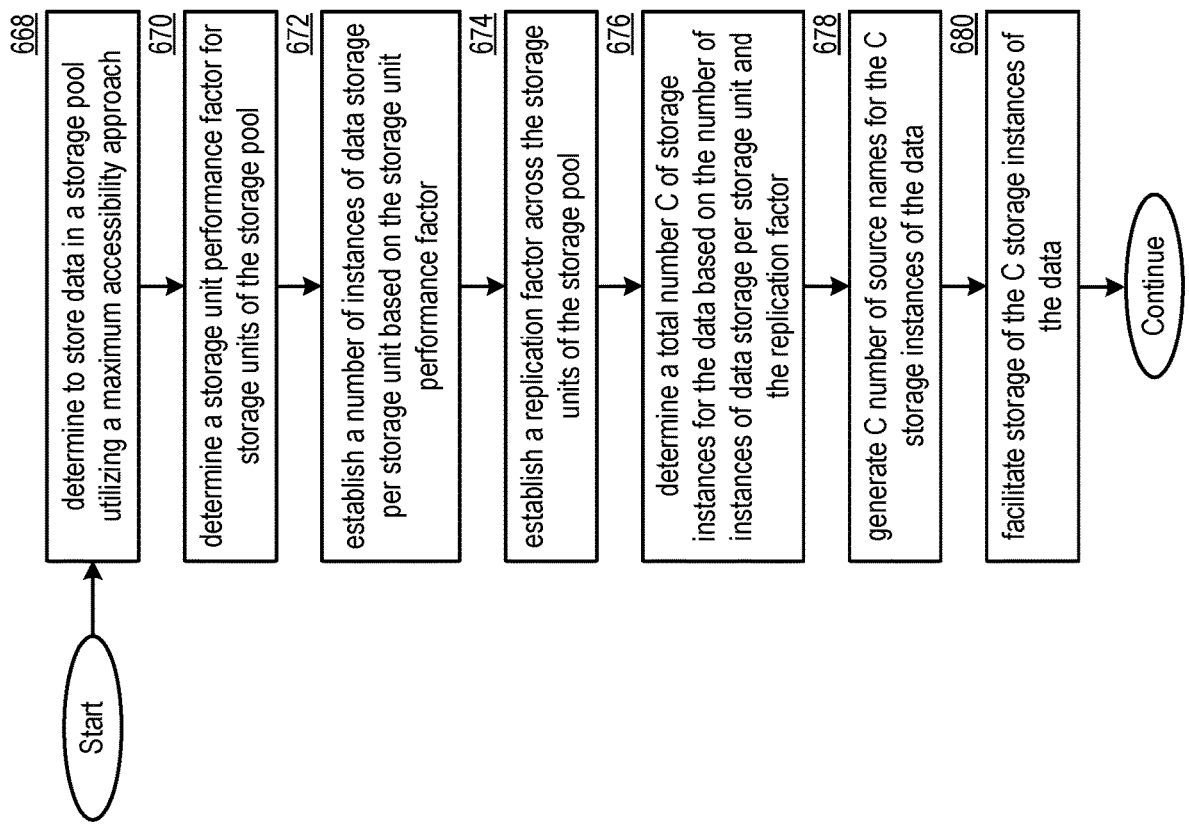
FIG. 10 is a logic diagram of an example of a method of storing data utilizing a maximum accessibility approach in accordance with the present invention.

FIG. 10 is a flowchart illustrating an example of storing data utilizing a maximum accessibility approach. In particular, a method is presented for use in association with one or more functions and features described in conjunction with FIGS. 1-9, for execution by a dispersed storage and task (DST) processing unit that includes a processor or via another processing system of a dispersed storage network that includes at least one processor and memory that stores instruction that configure the processor or processors to perform the steps described below.

The method includes step 668 where a processing system (e.g., of a distributed storage and task (DST) processing unit) determines to store data in a storage pool utilizing a maximum accessibility approach. The determining can include at least one of interpreting a request, identifying the data as frequently accessed and/or determining the data exceeds an access frequency threshold, and/or determining that available storage capacity is greater than a minimum storage capacity threshold level.

The method continues at step 670 where the processing system determines a storage unit performance factor for storage units of the storage pool. For example, the processing system divides a storage unit throughput level by a memory device throughput level (e.g., a 1 GB write per second memory device performance level divided by a 100 MB per second memory device throughput level equals a performance factor of 10).

The method continues at step 672 where the processing system establishes a number of instances of data storage per storage unit based on the storage unit performance factor.

For example, the processing system establishes the number of instances as a minimum of a number of memory devices per storage unit and the storage unit performance factor.

The method continues at step 674 where the processing system establishes a replication factor across the storage units of the storage pool. For example, the processing system calculates the replication factor by dividing the number of storage units of the storage pool by an information dispersal algorithm (IDA) width (e.g., 64 units divided by an IDA width of 16 equals 4).

The method continues at step 676 where the processing system determines a total number C of storage instances for the data based on the number of instances of data storage per storage unit and the replication factor. For example, the processing system multiplies or otherwise applies the number of instances of data storage by the replication factor (e.g., 10 instances multiplied by the replication factor of 4=40).

The method continues at step 678 where the processing system generates C number of source names for the C storage instances of the data. For example, the processing system generates a first source name for the data, identifies a DSN address range for the storage pool, generates further source name space by spacing source names apart by the DSN address range divided by C across the DSN address range starting with the first source name (e.g., either up or down across the range), and updates a directory to associate one or more of a name of the data and the first source name and the value of C.

The method continues at step 680 where the processing system facilitates storage of the C storage instances of the data. For example, for each storage instance, the processing system generates a plurality of sets of slice names based on a corresponding sourcing, dispersed storage error encodes the data to produce a plurality of sets of encoded data slices, generates one or more sets of write slice requests that includes the plurality of sets of slice names and the plurality of sets of encoded data slices, and sends the one or more write slice requests to a set of storage units associated with the storage instance. As an example of retrieving the data, the processing system accesses the directory to recover the first source name and the value of C, randomly and/or pseudo-randomly selects one storage instance, calculates the source name corresponding to the one selected instance, and recovers the data from the one selected instance.

In various embodiments, a non-transitory computer readable storage medium includes at least one memory section that stores operational instructions that, when executed by a processing system of a dispersed storage network (DSN) that includes a processor and a memory, causes the processing system to determine to store data in a storage pool utilizing a maximum accessibility approach. A storage unit performance factor is determined for a plurality of storage units of the storage pool. A number of instances of data storage per storage unit is established based on the storage unit performance factor. A replication factor across the plurality of storage units of the storage pool is also established. A total number C of storage instances for the data is determined based on the number of instances of data storage per storage unit and the replication factor. C number of source names for C storage instances of the data are generated. Storage of the C storage instances of the data is facilitated.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing system", "processing module", "processing circuit", "processor", and/or "processing unit" may be used interchangeably, and may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing system, processing module, module, processing circuit, and/or processing unit may be, or further include, memory and/or an integrated memory element, which may be a single memory device, a plurality of memory devices, and/or embedded circuitry of another processing system, processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing system, processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing system, processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing system, processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a storage processing unit that includes a processor, the method comprises:
   store data in a storage pool by:
      establishing a number of instances of data storage per storage unit of a plurality of storage units of the storage pool;
      establishing a replication factor across the plurality of storage units of the storage pool;
      determining a total number C of storage instances for the data based on the number of instances of data storage per storage unit and the replication factor; and
      facilitating storage of the C storage instances of the data.

2. The method of claim 1, further comprising:
   determining to store the data in the storage pool based on determining the data exceeds an access frequency threshold and determining that available storage capacity is greater than a minimum storage capacity threshold level.

3. The method of claim 1, further comprising:
- determining a storage unit performance factor for a plurality of storage units of the storage pool;
- wherein determining the storage unit performance factor includes dividing a storage unit throughput level by a memory device throughput level.

4. The method of claim 1, wherein the number of instances of data storage per storage unit is established as a minimum of a number of memory devices per storage unit and a storage unit performance factor.

5. The method of claim 1, wherein establishing the replication factor includes calculating the replication factor by dividing a number of storage units of the storage pool by an information dispersal algorithm (IDA) width.

6. The method of claim 1, wherein determining the total number C of storage instances includes calculating the total number C of storage instances by multiplying the number of instances of data storage by the replication factor.

7. The method of claim 1, further comprising:
- generating C number of source names for the C storage instances of the data by:
  - generating a first source name for the data;
  - identifying a DSN address range for the storage pool;
  - generating further source name space by spacing source names apart by the DSN address range divided by C across the DSN address range starting with the first source name; and
  - updating a directory to associate the first source name and a value of C.

8. The method of claim 7, further comprising:
- determining to recover the data;
- accessing the directory to recover the first source name and the value of C;
- pseudo-randomly selecting one of the C storage instances to recover;
- calculating a source name corresponding to the selected one of the C storage instances based on the first source name and the value of C; and
- recovering the data from the selected one of the C storage instances.

9. The method of claim 1, wherein facilitating storage of the C storage instances of the data includes, for each storage instance of the C storage instances:
- generating a plurality of sets of slice names based on a corresponding sourcing;
- dispersed storage error encoding the data to produce a plurality of sets of encoded data slices corresponding to the plurality of sets of slice names;
- generating a plurality of write slice requests that includes the plurality of sets of slice names and the corresponding plurality of sets of encoded data slices; and
- sending the plurality of write slice requests to a set of storage units of the plurality of storage units, wherein the set of storage units is associated with the storage instance.

10. A processing system of a storage processing unit comprises:
- at least one processor;
- a memory that stores operational instructions, that when executed by the at least one processor cause the processing system to:
  - store data in a storage pool by:
    - determining a storage unit performance factor for a plurality of storage units of the storage pool;
    - establishing a number of instances of data storage per storage unit based on the storage unit performance factor;
    - establishing a replication factor across the plurality of storage units of the storage pool;
    - determining a total number C of storage instances for the data based on the number of instances of data storage per storage unit and the replication factor; and
    - facilitating storage of the C storage instances of the data.

11. The processing system of claim 10, wherein the operations instructions further comprising determining to store the data in the storage pool based on determining the data exceeds an access frequency threshold and further determining that available storage capacity is greater than a minimum storage capacity threshold level.

12. The processing system of claim 10, wherein determining the storage unit performance factor includes dividing a storage unit throughput level by a memory device throughput level.

13. The processing system of claim 10, wherein the number of instances of data storage per storage unit is established as a minimum of a number of memory devices per storage unit and the storage unit performance factor.

14. The processing system of claim 10, wherein establishing the replication factor includes calculating the replication factor by dividing a number of storage units of the storage pool by an information dispersal algorithm (IDA) width.

15. The processing system of claim 10, wherein determining the total number C of storage instances includes calculating the total number C of storage instances by multiplying the number of instances of data storage by the replication factor.

16. The processing system of claim 10, generating C number of source names for the C storage instances of the data by:
- generating a first source name for the data;
- identifying a DSN address range for the storage pool;
- generating further source name space by spacing source names apart by the DSN address range divided by C across the DSN address range starting with the first source name; and
- updating a directory to associate the first source name and a value of C.

17. The processing system of claim 16, wherein the operational instructions, when executed by the at least one processor, further cause the processing system to:
- determining to recover the data;
- accessing the directory to recover the first source name and the value of C;
- pseudo-randomly selecting one of the C storage instances to recover;
- calculating a source name corresponding to the selected one of the C storage instances based on the first source name and the value of C; and
- recovering the data from the selected one of the C storage instances.

18. The processing system of claim 10, wherein facilitating storage of the C storage instances of the data includes, for each storage instance of the C storage instances:
- generating a plurality of sets of slice names based on a corresponding sourcing;
- dispersed storage error encoding the data to produce a plurality of sets of encoded data slices corresponding to the plurality of sets of slice names;
- generating a plurality of write slice requests that includes the plurality of sets of slice names and the corresponding plurality of sets of encoded data slices; and sending the plurality of write slice requests to a set of storage units of the plurality of storage units, wherein the set of storage units is associated with the storage instance.

19. A computer readable storage medium comprises:
at least one memory section that stores operational instructions that, when executed by a processing system of a storage network that includes a processor and a memory, causes the processing system to:
store data in a storage pool by:
  determining a storage unit performance factor for a plurality of storage units of the storage pool;
  establishing a number of instances of data storage per storage unit based on the storage unit performance factor;
  establishing a replication factor across the plurality of storage units of the storage pool;
  determining a total number C of storage instances for the data based on the number of instances of data storage per storage unit and the replication factor; and
  facilitating storage of the C storage instances of the data.

20. The computer readable storage medium of claim 19, wherein establishing the replication factor includes calculating the replication factor by dividing a number of storage units of the storage pool by an information dispersal algorithm (IDA) width.

* * * * *